United States Patent

Rosse et al.

[15] 3,703,336
[45] Nov. 21, 1972

[54] ANALYSIS SYSTEM EMPLOYING A PLURAL CHAMBER CUVETTE STRUCTURE

[72] Inventors: Thomas A. Rosse, Lexington; David E. Blackmer, Harvard; Jerrold Zindler, Cambridge; Thomas F. Kelley, Canton, all of Mass.

[73] Assignee: Instrumentation Laboratory, Inc., Lexington, Mass.

[22] Filed: June 12, 1970

[21] Appl. No.: 45,758

[52] U.S. Cl. ............... 356/39, 23/253 R, 250/218, 356/205, 356/246
[51] Int. Cl. ............................................. G01n 21/24
[58] Field of Search .......... 23/253; 250/106 SC, 218, 250/219 DC; 235/151.35, 61.6 H; 356/246, 39, 40, 180, 205

[56] References Cited

UNITED STATES PATENTS

| | | |
|---|---|---|
| 3,422,271 | 1/1969 | Fuhrmann ............... 250/218 |
| 3,437,822 | 4/1969 | Fitzsimmons ............. 356/205 |
| 3,523,737 | 8/1970 | Wood et al. ............. 356/246 |
| 3,562,501 | 2/1971 | Mears ................. 235/151.35 |
| 3,571,596 | 3/1971 | Frank et al. .......... 250/106 SC |

Primary Examiner—Ronald L. Wibert
Assistant Examiner—Orville B. Chew, II
Attorney—Willis M. Ertman

[57] ABSTRACT

An analysis system includes a plural chamber cuvette assembly that holds chemical materials and is adapted to receive an unknown to be analyzed in one of the chambers, a record that specifies information as to the nature of the stored chemical material and the type of analysis to be performed, and photometric instrumentation for performing a chemical analysis that responds to the material in the sample chamber in the cuvette assembly and the record. The instrument is automatically calibrated in response to information specified by the record and an analysis is performed automatically merely in response to the operation of a single control.

29 Claims, 11 Drawing Figures

PATENTED NOV 21 1972

ANALYSIS SYSTEM EMPLOYING A PLURAL CHAMBER CUVETTE STRUCTURE

SUMMARY OF INVENTION

This invention relates to analysis systems.

A need exists for instrumentation that produces accurate chemical analysis data and which can be operated by untrained personnel. Such instrumentation would assist laboratories in contending with the shortage of skilled personnel and as such should minimize the number of operations required, eliminate the need for calculations, and present the analysis results directly, accurately and unambiguously. Chemical analyses may be performed in a variety of manners. In photometric analyses, for example, measurements may be made directly, by comparison with a standard, or as a function of the rate of chemical change. Such techniques are frequently employed in the analysis of blood or other body fluids. Frequently as part of a diagnostic procedure, a chemical analysis of a sample of such fluid for enzymes, hemoglobin, chloresterol, glucose etc. provides useful diagnostic information. While laboratory services for performing such analyses are available, the use of such services often entails a delay of several days or more before analysis information is available.

It is an object of this invention to provide a novel and improved analysis system which facilitates operation of analysis instrumentation by untrained personnel.

Another object of the invention is to provide a novel and improved instrumentation for use with prepackaged chemical materials which enables such materials to be stored in a reliable manner, and to easily be used in obtaining analysis information.

A further object of this invention is to provide novel and improved analysis instrumentation.

Another object of the invention is to provide novel and improved chemical analysis instrumentation particularly adapted for use in the analysis of blood samples.

A further object of the invention is to provide a novel and improved analysis system which enables the performance of complex blood chemical analytical procedures with the minimum of trained technique while obtaining data sufficiently accurate for diagnostic purposes.

Another object of the invention is to provide a novel and improved analysis system which can be used for a wide variety of blood chemistry tests.

In accordance with the invention there is provided an analysis system which includes a container for storing a chemical material and having means for introducing a material to be analyzed into the container for mixing with the stored chemical material. Associated with the container is a record that specifies information as to the nature of the stored chemical material and the type of analysis to be performed. Instrumentation for performing the analysis includes means for receiving the container to process the mixture of materials stored therein, and means responsive to information on the record for setting components of the instrumentation to perform an analysis as a function of a characteristic of the chemical material as specified by the record.

In a preferred analysis system the instrumentation includes a radiation source and a detector in spaced relation defining an optical path. Means are provided for positioning a plural chamber cuvette assembly in the optical path. The system further includes circuitry for modifying the output signal produced by the detector from the material in one sample chamber as a function of the output signal produced by the detector from the material in another sample chamber and providing a signal indicative of a parameter of the material in the first sample chamber. In a particular embodiment, the cuvette assembly includes three sample chambers for holding an unknown blood sample to be analyzed, a standard material, and a blank material. The circuitry generates three absorption signals $A_X$, $A_S$, and $A_B$ and from these signals generates two difference signals $(A_X-A_B S-A_B)$ and a signal that is a function of the ratio of those two difference signals.

While the sample chambers may be sensed simultaneously or sequentially, in a preferred embodiment a single optical path is established and the chambers are moved into that optical path sequentially. In that embodiment the modifying circuitry includes a first storage circuit for holding a signal representative of the blank material, a second storage circuit for holding a signal representative of the standard material, and circuitry for generating the modified signal as a function of the stored signals.

Other objects, features and advantages of the invention will be seen as the following description of a particular embodiment progresses, in conjunction with the drawings, in which.

DESCRIPTION OF PARTICULAR EMBODIMENT

Figure 1:
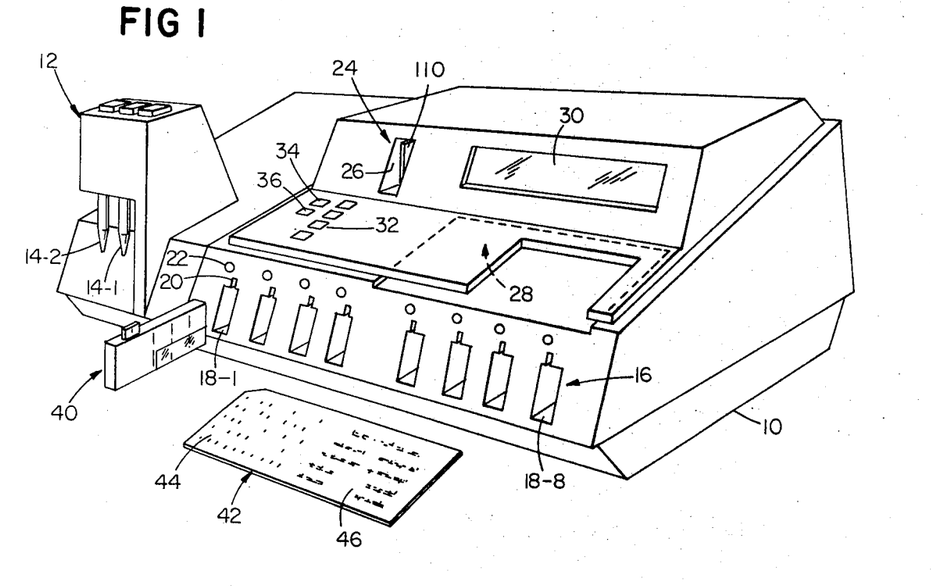
FIG. 1 is a perspective view of components of a biochemical analysis system constructed in accordance with the invention.

With reference to FIG. 1 there is shown a biochemical analysis instrument that includes a housing 10 on which is mounted a dispensing unit 12 having two dispensing channels 14-1 and 14-2. To the right of the dispensing unit 12 is an incubator section 16 that includes incubator chambers 18-1 - 18-8. At the top of each incubator chamber is an interlock slot 20 and above each chamber is an indicator light 22. A photometer section 24 is disposed above the incubator section 16 and includes a slot 26 for receiving a cuvette assembly 40; a card reader unit 28; a digital display 30; a units display 32; a start button 34 and an alarm lamp 36. Used with this instrument is a disposable cuvette assembly 40 and a correlated card 42 which includes a data section 44 having calibrating and control information and an instruction section 46. In a typical system, a kit of 20 cuvette assemblies 40, a supply of a standard (if necessary) for use with the cuvette assemblies 40 and a control card 42 having coded calibrating and control information correlated with the standard material and the analysis to be performed is supplied for use with the instrument. A different kit is provided for each type of analysis.

Figure 2:
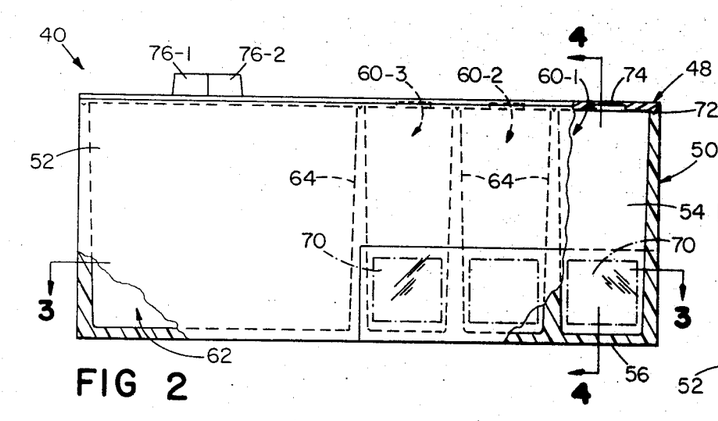
FIG. 2 is a side view, with parts broken away, of the cuvette assembly shown in FIG. 1.
Figure 3:
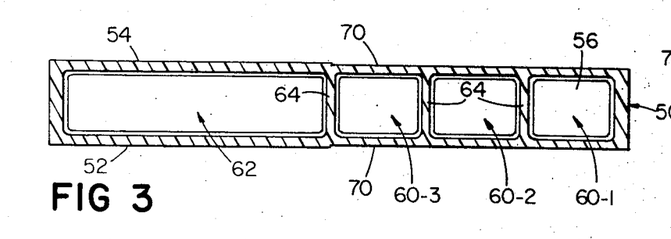
FIG. 3 is a sectional view of the cuvette assembly taken along the line 3—3 of FIG. 2.
Figure 4:
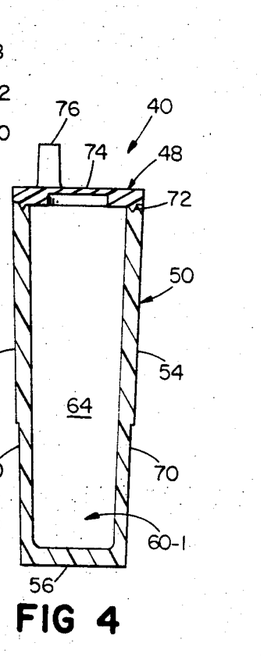
FIG. 4 is a sectional view of the cuvette assembly taken along the line 4—4 of FIG. 2.

The cuvette assembly 40, as shown in FIGS. 2–4, is formed of two components, a top 48 and a body portion 50, both formed of suitable material such as glass, or a polymeric material such as a polyolefin, a polycarbonate, or an acrylic. A preferred material is a transparent TPX methylpentene polyolefin material that has an absorption of approximately 0.125 optical density at a wavelength of 3,400 Angstroms; a vicat softening point of 179°C; and excellent chemical resistance properties.

The body 50 has two side walls 52, 54, each 0.050 inch thick, that taper outwardly from bottom to top at an angle of about 1°. Side walls 52, 54 are joined together at their bottom by base wall 56. As indicated in FIGS. 2 and 3, three sample chambers 60-1, 60-2 and 60-3 and a handle chamber 62 are formed in the cuvette assembly. These chambers are defined by lateral separator wall members 64 that have a thickness at their upper ends of about 0.040 inch. Each sample chamber 60 has a transverse width between side walls 52, 54 of about three-eighths inch and a lateral width of about ⅝ inch. The height of the cuvette assembly is 1⅝ inches and its length is 4 inches. Instruction and/or labeling information may be secured to one or both inner surfaces of the handle chamber 62. Formed in the outer surface of each side wall of the three sample chambers 60 is an optical surface 70 of about nine-sixteenths inch in height and having a surface finish in the order of 5 micro-inches. Each surface is recessed about 0.005 inch to provide a protective zone. In the optical area defined by surface 70, the side wall thickness in each chamber 60 is maintained within a tolerance of 0.0004 inch of the mean wall thickness of the three chambers. The optical path lengths of the three chambers thus are identical within close tolerances.

The cover member 48 has a downwardly projecting ridge 72 which engages the upper surface of the body 50 and, after chemical material has been introduced into one or more of the chambers 60, a hermetic seal of the chambers 60 and 62 is provided as by ultrasonic welding. In the upper wall of each chamber is formed a frangible section 74 of reduced thickness which may be broken away to permit introduction of materials such as a reconstituting agent or the unknown to be analyzed into the sample chambers 60. An interlock key 76, divided into two sections 76-1 and 76-2, projects from the upper surface of the cover member 48. Either section 76-1 or 76-2 may be omitted thus varying the coding.

Figures 5, 6:
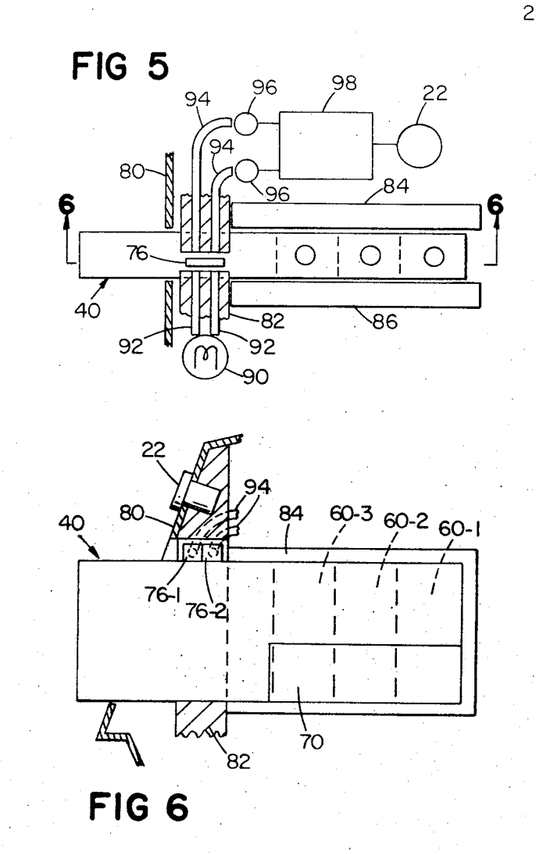
FIG. 5 is a top plan diagrammatic view of the cuvette assembly and an incubator unit of the apparatus shown in FIG. 1.
FIG. 6 is a diagrammatic sectional view taken along the line 6—6 of FIG. 5.

As shown in FIGS. 5 and 6, each incubator chamber 18 is of cast aluminum and is disposed behind an aperture in the front wall 80 of the instrument. Immediately behind wall 80 is a thermal insulator member 82 which provides thermal isolation between areas outside the instrument and the incubator resistance heater rod elements 84, 86. Four of the incubator chambers (18-1 – 18-4) have thermistor controlled heaters set at 37°C and controlled to maintain temperature within 0.3°C and the other four incubator chambers (18-5 – 18-8) have thermistor controlled heaters set at 100°C and controlled to maintain temperature within 1°C. A light source 90 is associated with each pair of incubator chambers 18 and four transmitting fiber optic channels 92, two in each direction, extend from light source 90 with their remote ends supported in the corresponding insulator member 82. A corresponding aligned pair of receiving fiber optic channels 94 are secured in the opposed insulator member and are coupled via photodiodes 96 to timing and control logic 98 which provides three different timing intervals and in turn operates indicator lamp 22 and an audible buzzer (not shown). Normally light from lamp 90 is fed via transmitting fiber optic channels 92 to the receiving fiber optic channels 94 for sensing by photosensors 96. When a cuvette assembly 40 is inserted in a proper incubator chamber 18, the location of projection 76 on the left or right side of assembly 40 being keyed to the position of interlock slot 20, one or both sections 76-1, 76-2 (depending on the coding) block the transmission of light to sensors 96 and operate timing logic 98 to initiate a timing cycle. With this coding three different timing cycles may be initiated, and it will be obvious that other additional timing cycles may be obtained by varying the nature of the coded control tab 76. At the end of the timing cycle selected, logic 98 produces an output that energizes lamp 22 and the buzzer to indicate to the operator that the cuvette assembly 40 in that incubator chamber is ready for photometric analysis.

Figure 7:
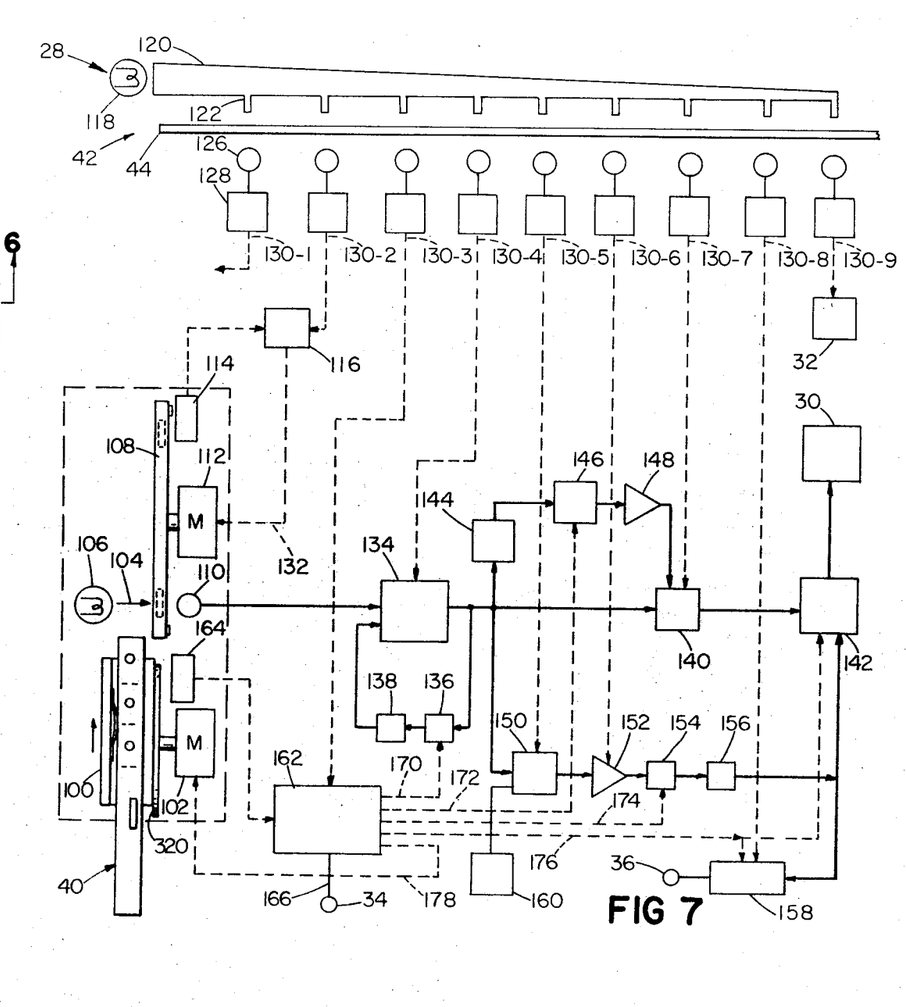
FIG. 7 is a block diagram of the photometric system of the apparatus shown in FIG. 1.

A block diagram of the photometric section of the instrument is shown in FIG. 7. That section includes a shuttle 100 (disposed behind port 26) which receives and secures the cuvette assembly 40 in a predetermined location and which is driven via shuttle drive linkage by a motor 102. The shuttle drive sequentially positions the three chambers 60 in an optical path 104 that extends from a twenty watt quartz iodine radiation source 106 through filter wheel 108 to photodiode radiation sensor 110. The filter wheel 108 is in the form of a disc and has six circumferentially disposed filter elements and is rotated by a motor 112. The position of the filter disc is sensed by cooperation of slots in the filter disc and a plurality of photoelectric light sensors and logic (diagrammatically indicated at 114) which provide a binary coded output signal to compare circuit 116.

The card reader 28 which senses the data portion 44 of card 42 has a light source 118 and light distributing system 120 that has 50 output channels 122 arranged in 5 × 10 matrix. A check channel is also provided to verify the proper positioning of the card in the reader. Each sensor channel of the card reader includes a light sensor 126, and one or more of the light sensors are coupled to translating logic 128 which applies control signals over output lines 130. The signals on line 130-1 are applied to control the operation of dispenser 12; the signals on output line 130-2 are applied as an input to comparison logic 116; the signals on output lines 130-3 – 8 are applied to control the signal processing circuitry that responds to material in the cuvette chambers; and the output signal on line 130-9 is applied to the decimal display unit. The data on the card identifies the particular test and has dispensing information and calibration information as a function of the particular test and the chemicals supplied for performing the test. For example, output channel 130-2 applies a signal to compare circuit 116 and that signal applies an output over line 132 to control the filter wheel drive motor 112. Thus, in response to test mode information stored on the card 42 that is correlated with a particular cuvette assembly 40, on insertion of that card into the card reader, the compare circuit 116 provides an output on line 132 to energize motor 112 and rotate filter wheel 108 until the proper filter element is positioned in the optical path 104. Motor 112 is then de-energized.

The output of radiation sensor 110 is applied to a log converter circuit 134 which provides an output as a logarithmic function of the input signal from photodiode 110. Connected in circuit with the log converter arrangement is a switch 136 and a hold circuit 138. The output of the log converter circuit is applied through a first input of switch 140 to a digital voltmeter 142; along a second path through differentiator 144, filter network 146 and absolute value amplifier 148 to a second input of switch 140; and along a third path through a first input of switch 150, scaling amplifier 152, switch 154 and storage circuit 156. The output of storage circuit 156 is applied to the reference input of the digital voltmeter 142 and to error logic 158 which has an output that energizes error indicator or alarm lamp 36 when the output of the hold circuit 156 deviates from preestablished limits as specified by data from the card reader supplied on output line 130-8. Switch 150 has a second input from a precision voltage source 160. The circuitry also includes control logic 162 which responds to inputs from sensor 164 that provides an indication for position of the cuvette shuttle 100; inputs from the card reader over output lines 130-3; and inputs from start button 34. The logic has outputs over line 170 to control switch 136, over line 172 to control a switch in filter network 146, over line 174 to control switch 154, over line 176 to the digital voltmeter 142 and the error logic 158 in a strobing operation, and on line 178 to control the shuttle drive motor 102.

Figure 8:
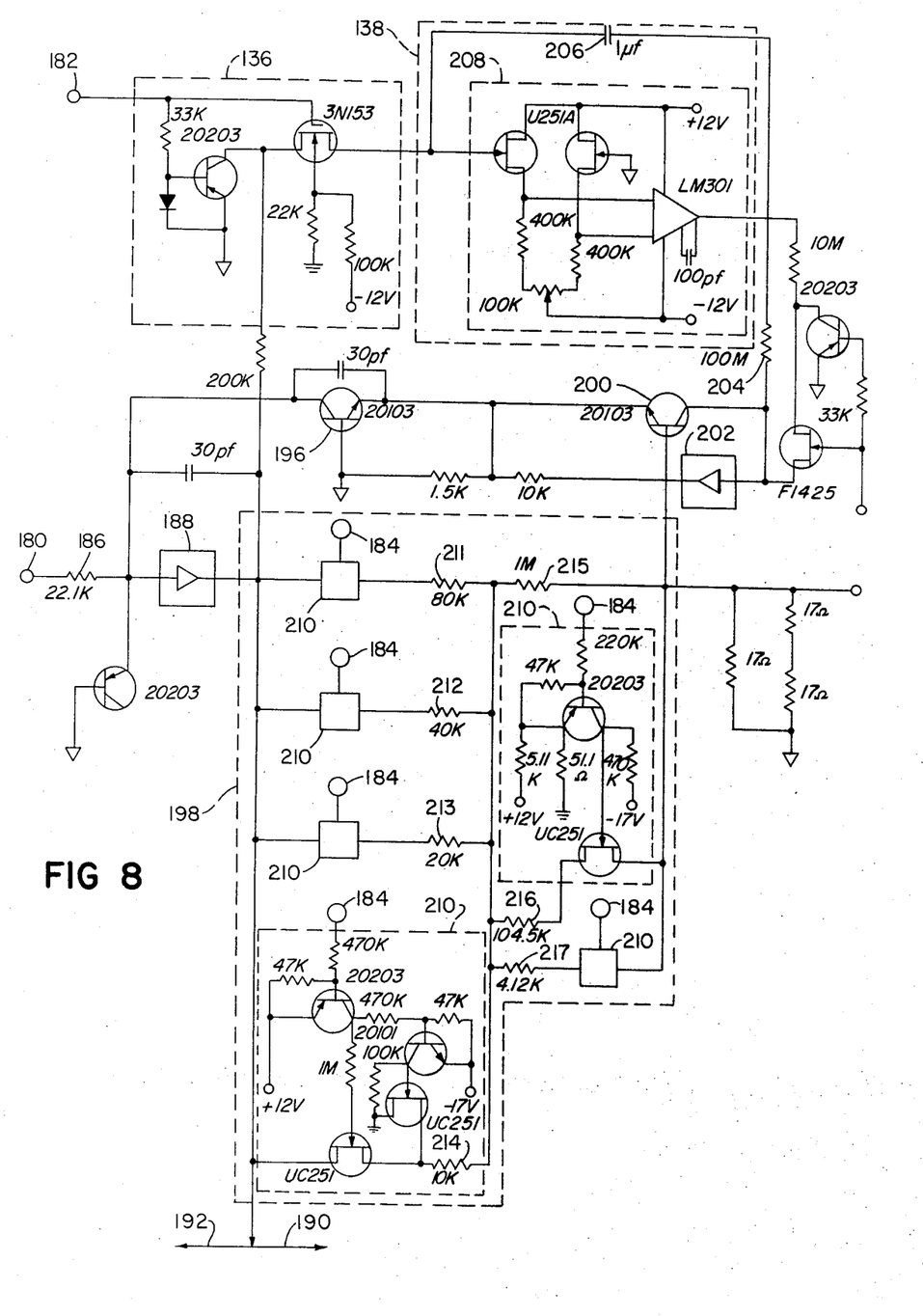
FIG. 8 is a schematic diagram of the log converter circuitry indicated in block 134 in FIG. 7.

A schematic diagram of the log converter circuit 134, switch 136 and storage circuit 138 is shown in FIG. 8. Terminal 180 receives a signal from photodiode 110 which in this embodiment is a TS 433 photodiode; terminal 182 receives a signal from logic circuit 162 on line 170 and terminals 184 receive signals from the card reader over lines 130-4. The signal applied at input 180 is applied through resistor 186 to the input of forward amplifier stage 188. The output of stage 188 is applied over output line 190 to differentiator 144, over line 192 to switch 150, and through resistor 194 to switch 136. Log converter transistor 196 is connected in the feedback path around forward amplifier 188 and in circuit with a digitally programmed voltage divider 198 and reference transistor 200. Transistor 200 is in the feedback loop of reference current source amplifier 202 and resistor 204 is connected to the output of memory circuit 138 that includes capacitor 206 and zeroing amplifier 208 which is similar to forward amplifier 188 and reference current source amplifier 202. The digitally programmed voltage divider 198 includes switch units 210, each of which is connected in series with a corresponding resistor 211–217. The network of resistors 211–214 may be either connected in series or grounded to provide a first voltage divider network that defines a digit value, and resistors 215–217 may be selectively connected in circuit to provide a multiplier effect, this circuitry providing allowing selection of the volts per decade response of the system over a range of values from one volt per decade to 1,500 volts per decade. Additional information concerning this circuitry may be had with reference to copending application Ser. No. 45,705 now U.S. Pat. No. 3,659,082 entitled ELECTRICAL CIRCUITRY and filed concurrently herewith in the name of Norman F.F.J. Rolfe and assigned to the same assignee as this application.

Figure 9:
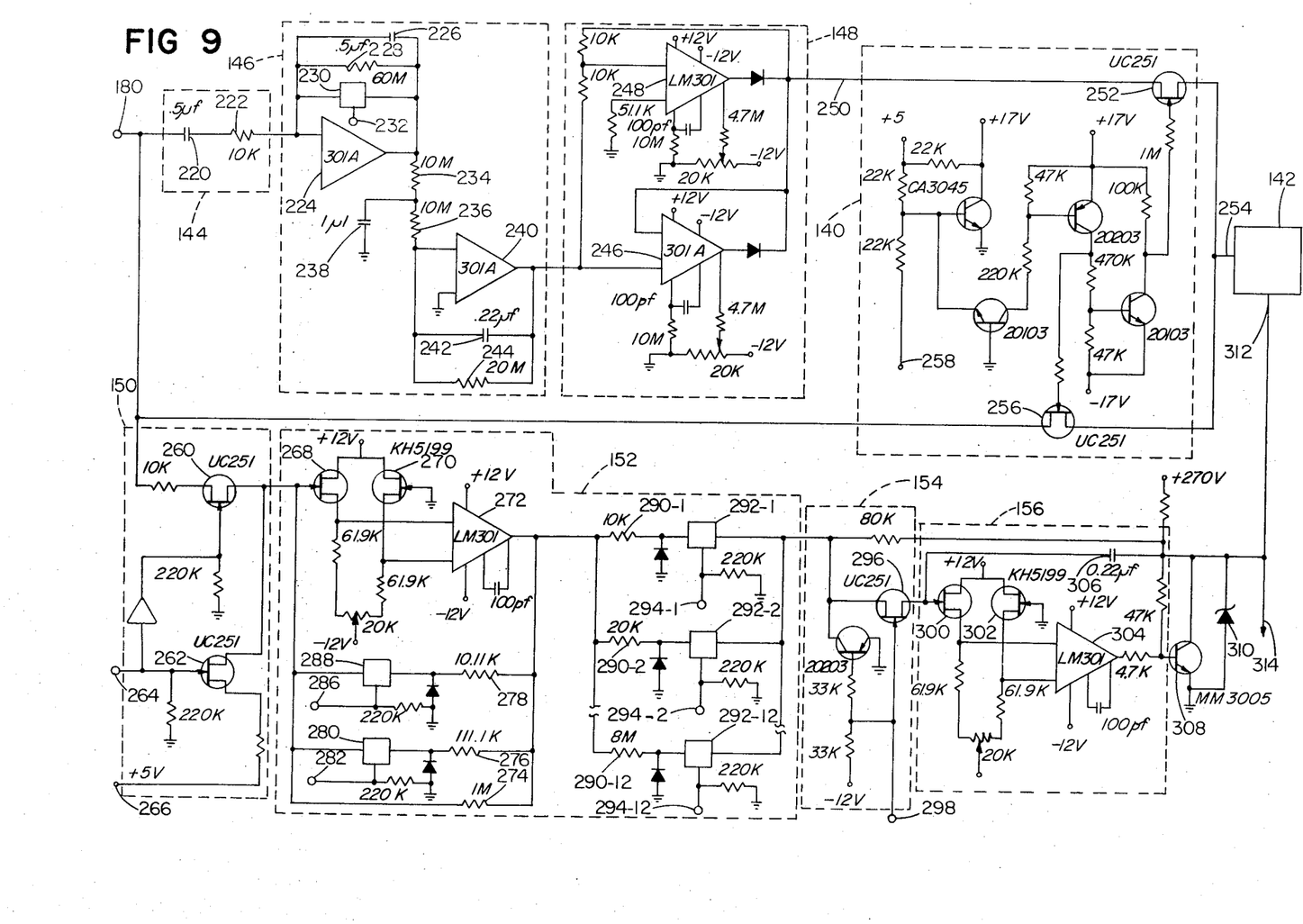
FIG. 9 is a schematic diagram of other components of the electrical circuitry shown in block form in FIG. 7.

Additional details concerning other components of the electrical circuitry may be had with reference to FIG. 9. As shown in that Figure, the output from the log converter 134 at terminal 180 is applied through a differentiator circuit 144 which includes capacitor 220 and resistor 222. A filter network 146 includes three filter stages, a first stage including a low input current operational amplifier diagrammatically indicated at 224 across which is connected a capacitor 226, resistor 228 and switch 230 that is operated in response to a signal on line 172 applied at terminal 232; the second stage includes low pass filter having resistors 234 and 236 and capacitor 238; and a third stage similar to the first stage includes operational amplifier 240, capacitor 242 and resistor 244. The output of the filter network 146 is applied to an absolute value amplifier stage 148 that includes two operational amplifier circuits 246, 248 arranged so that the output at line 250 is always positive. The signal on line 250 is applied to switch network 140 and specifically to the FET switch 252 for application to input 254 of the digital voltmeter 142. A second FET switch 256 is connected in circuit between terminal 180 and input 254. Switch network 140 is operated in response to a signal from the card reader over line 130-7 applied at terminal 258.

A signal from terminal 180 is also applied to switch network 150 which includes field effect transistors 260 and 262, the switch network being operated in response to a signal from the card reader over lines 130-5 applied at terminal 264 to either connect terminal 180 or precision voltage source 160 to the scaling amplifier 152. That amplifier includes a low input current operational amplifier stage that includes two field effect transistors 268, 270 and operational amplifier 272. Connected across the operational amplifier is a multiply network that includes resistors 274, 276 and 278, resistor 276 being connected in circuit by switch 280 in response to a signal from the card reader over line 130-6 applied at terminal 282 and resistor 278 being connected in circuit by switch 284 in response to a similar signal over line 130-6 applied at terminal 286. Connected between the output of operational amplifier circuit 272 and switch 154 is a twelve stage digit network that includes resistors 290, each of which is connected in circuit by a switch 292 in response to a signal from the card reader over line 130-6 applied at terminal 294. Switch 154 includes a field effect transistor 296 and operates in response to a signal from logic circuit 162 over line 174 applied at terminal 298. The storage circuit 156 includes a similar amplifier stage that includes two field effect transistors 300, 302, an operational amplifier 304 and a storage capacitor 306. Output transistor 308 has voltage limiting zenar diode 310 connected across it and the circuit output is applied to the reference input 312 of the digital voltmeter. A signal is also applied on line 314 to the error check circuit 158.

Figures 10, 11:
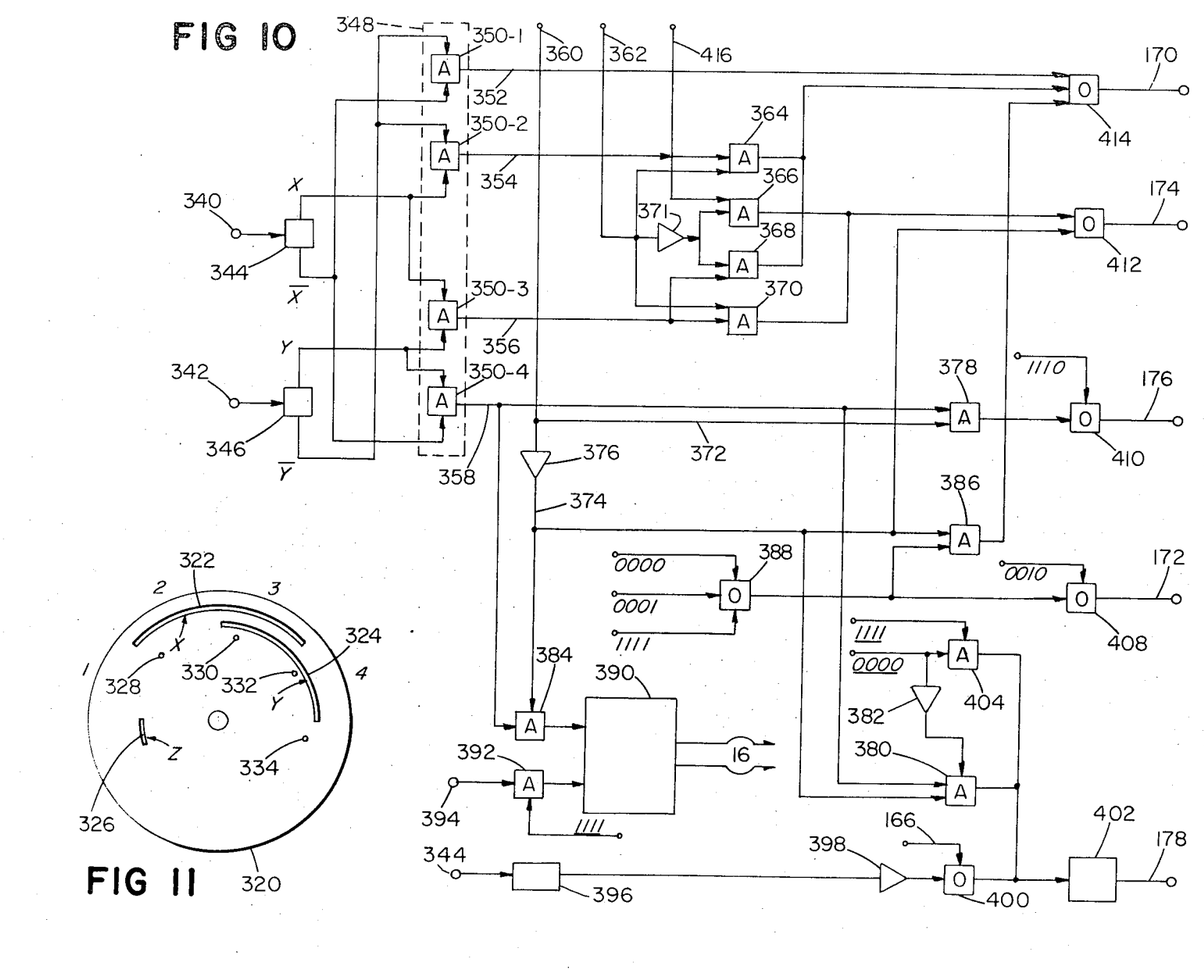
FIG. 10 is a logic diagram of the logic indicated by block 162 in FIG. 7.
FIG. 11 is a diagrammatic view of the sensor 164 that controls and indicates the position of the cuvette shuttle.

The logic circuit 162, shown in FIG. 10 operates in response to signals from the cuvette drive sensor 164. That sensor, as shown in FIG. 11, includes a mask member 320 which is driven in rotation by motor 102 and has three slots 322, 324, and 326 that provide, respectively, X, Y, and Z signals. When the motor drive 102 is in the rest position light passes through slot Z. When the motor is energized, the drive is rotated to advance mask disc 320 to a first measurement position ($\bar{X}$, $\bar{Y}$) while the cuvette 40 is not interposed in light path 104 (position 1). The motor is driven continuously and at point 328 (shortly after the condition X, $\bar{Y}$ has been established) the cam on the drive advances the shuttle to position the first sample chamber 60-1 in the light path 104. At point 330 (in the XY condition) the shuttle is advanced to position the middle sample chamber 60-2 in the light path; and at point 332 (in the $\bar{X}$Y condition) the drive advances the shuttle to position the third chamber 60-3 in the light path. At point 334 the shuttle is returned to its initial position and when the Z slot 326 is reached the motor 102 is turned off. The X light sensor applies a signal at terminal 340, the Y light sensor applies a signal at terminal 342 and the Z light sensor applies a signal at terminal 344. Each X and Y signal is applied through an inverter 346 to generate X and $\bar{X}$ signals and Y and $\bar{Y}$ signals as indicated and those signals apply in coding logic that includes AND circuits 350 to generate control outputs, the output on line 352 indicating the control disc 320 is in position 1, the output on line 354 that disc 320 is in position 2, the output on line 356 that disc 320 is in position 3 and the output on line 358 that disc 320 is in position 4. The output on line 354 is also applied on line 416 to reset the error signal circuit.

Information is also supplied to the logic circuit from the card reader, rate-static mode information being supplied on line 360 and other control information on line 362. A group of four AND circuits 364, 366, 368 and 370, together with inverter 371 respond to signals on lines 354, 356 and 362. AND circuit 364 has an output in response to inputs on lines 354 and 362; AND circuit 366 has an output in response to an input in line 354 and the absence of a signal on line 362; AND circuit 368 has an output in response to input on line 356 and the absence of signal on line 362; and AND circuit 370 has an output in response to signals on lines 356 and 362.

The input over lines 130-3 from the card reader on appears on line 360 and provides rate and mode information, the presence of the signal on line 360 indicating that the circuitry is to operate in a static mode and the absence of such signal indicating that the instrument is to operate in a rate mode. Thus the signal on line 372 indicates static mode and a signal on line 374 passed by inverter 376 indicates a rate mode. The static mode signal is applied to AND circuit 378 and that circuit has an output when it is also conditioned by an input on line 358. The static mode signal is also applied to AND circuit 380 which has another input from line 358 and still another input from inverter 382. The rate mode signal on line 374 is applied to AND circuit 384 which has a second input from line 358, to AND circuit 386 which has a second input from OR circuit 388 and to OR circuit 412. The output of AND circuit 384 is applied to timer 390 (a four stage device that counts from zero to 15 in response to signals passed by AND circuit 392 from clock signals at four second intervals at terminal 394). The signal from the Z sensor at terminal 344 is applied through amplifying circuitry 396 and an inverter 398 to OR circuit 400 which has a second input from start switch 34 on line 166 and its output is applied to motor control circuit 402 which controls the shuttle drive motor 102. Subsidiary controls responsive to timer outputs are applied to this circuit from the AND circuits 380, 404. Timer outputs are also applied through OR circuit 388 and inverter 406 to OR circuit 408 which has a second input from the timer output (0010) and produces an output on line 172 to reset the filter network and start a rate measurement that continues through time (1110). OR circuit 410 has a first input from AND circuit 378 and a second input from the timer output (1110) and an output on line 176 which strobes the digital voltmeter 142 and the error check circuit 158. OR circuit 412 has an output on line 174 to operate the switch 154 in response to a rate mode signal on line 374 or a signal from either AND circuit 366 or 370. OR circuit 414 provides an output on line 170 to cause the zeroing operation of the log amplifier and has inputs from line 352 and from AND circuits 364, 368 and 386.

A variety of biochemical analyses may be performed with this apparatus. The following table indicates typical examples of the types of tests that may be made with this apparatus:

| test | λ/nm | units | incubation temperature | normal range | incubation time minutes |
|---|---|---|---|---|---|
| glucose ortho toluidine condensation procedure | 640 | mg/100 ml | 100°C | 60–100 | 20 |
| urea (BUN) Diacetyl monoxime procedure | 525 | mg/100 ml | 100°C | 8–18 | 15 |
| hemoglobin cyanmethemoglobin | 505 | g/100 ml | 37°C | 10–23 | 5 |
| total protein biuret method | 525 | g/100 ml | 37°C | 6–8 | 15 |
| cholesterol Liebermann-Burchard reaction | 640 | mg/100 ml | 37°C | 110–250 | 10 |
| total bilirubin | 525 | mg/100 ml | 37°C | 0.6–1.5 | 5 |
| LDH Wacker | 340 | IU | 37°C | 12–50 | 10 |
| GOT Karmen | 340 | IU | 37°C | 5–10 | 10 |
| CPK-Roaslki | 340 | IU | 37°C | 12–90 | 10 |
| alkaline phosphatase Bessey-Lowry | 404 | IU | 37°C | 13–42 | 10 |

For each test, a kit of correlated material is supplied, a typical kit including a set of 20 cuvettes 40, a supply of a standard for use with the 20 cuvettes and calibrating data card 42 which contains control data for the particular test including data on the standard. The components of the kit are related, as by color coding to facilitate operator handling.

This instrument as controlled by a card 42 and card reader 28 is operable in the following three modes:

Standard $R = (A_X - A_B)/(A_S - A_B) \times K$
Absolute $R = (A_X - A_B) \times K$
Rate $R = dAx/dt \times K$ An illustrative example of each mode follows. Determination of serum glucose uses the standard mode. All three cuvette chambers 60-1 - 60-3 contain four milliliters of liquid reagent (6 percent orthotoluidine in glacial acetic acid) when the cuvette is received by the user. Under the control of card reader 28 and the corresponding "glucose" data card 42, the card reader has an output over channel 130-1 to control dispenser 12 and load dispenser channel 14-1 with one hundred microliters with a glucose serum standard (containing a precisely predetermined 200 milligrams per 100 milliliters, and that is coordinated with the glucose data card 42) and channel 14-2 is loaded with 100 microliters of a sample of the serum to be analyzed (typically that of a patient). A cuvette is then positioned so that chamber 60-2 and 60-3 are aligned with channels 14-1 and 14-2, respectively, and these volumes are discharged into those chambers. Nothing is added to chamber 60-1. After the chambers have been resealed and the contents mixed by inversion, the cuvette assembly 40 is placed in one of the 100°C incubator units 18-5 - 18-8 and incubated for 20 minutes.

When the incubation period is complete, the lamp 22 above that chamber lights (and an audible alarm is sounded). With the glucose data card 42 in the card reader 28, the card causes motor 112 to stop the filter wheel 108 so that the 6400 Angstrom filter is disposed in the optical path 104 between the lamp 106 and photodiode 110 by an output signal over line 130-2. Gain factors are adjusted in the log converter circuit 134 by an output over line 130-4 and in the scaling amplifier 152 by an output over line 130-6. The card reader also closes switch 150 so that the output from the log converter circuit 134 is applied directly through switch 150 to the scaling amplifier 152, and energizes an appropriate decimal point, and the appropriate units display 32. Depression of the start button 34 applies a signal over line 166 to logic 162 which in turn generates a control signal over line 178 to energize the shuttle drive motor 102.

Initially the cuvette assembly is in the position shown in FIG. 7 (position 1). The shuttle drive advances the cuvette assembly to position 2 so that chamber 60-1 is positioned in the optical path 104. During these intervals, the shuttle position sensor 164 indicates to the logic circuitry 162 the position of the cuvette and during these intervals, the logic circuitry 162 produces an output over line 170 to close the switch 136 in the log converter feedback path, applying the output signal from the log converter through switch 136 and storage circuit 138 as a feedback to the log converter circuit 134 in a zeroing operation. Since chamber 60-1 contains only the "blank" solution (no glucose standard or unknown was added to this chamber) the intensity of light striking the photosensor 110 and its output current corresponds photometrically to the zero concentration of glucose. The log converter circuit 134 has this current applied to it and produces an output voltage equal to the log of the input current. This output signal is fed back through switch 136 and storage circuit 138 as a reference current to the log converter circuit. Switch 136 is then opened and the storage circuit 138 holds this voltage and continues to apply a reference current to the log converter that is proportional to the negative intensity of the blank solution.

The shuttle mechanism, after an interval of about two seconds in position 2, advances the cuvette to position 3 so that standard chamber 60-2 is positioned in the optical path 104. This action is sensed by sensor 164 and applies a signal to logic circuitry 162 to produce an output signal on line 174 to close switch 154. The gain of the scaling amplifier 152 has been set from signals from the card reader over line 130-6 to calibrate the scaling amplifier as a function of the standard glucose solution supplied with the card. During that interval that the "standard" in chamber 60-2 is in path 104, the current generated by sensor 110 causes the log converter 134 to produce an output voltage proportional to log of the absorbance of the standard minus the absorbance of the blank ($A_S - A_B$). After amplification in accordance with the calibrating information from the card reader, this signal is stored as a voltage in storage circuit 156 and applied to the reference voltage input of the digital voltmeter 142.

The shuttle mechanism, again after interval of about two seconds, advances the cuvette so that the third (unknown) chamber 60-3 is positioned in the optical path 104. Sensor 164 produces a position four output signal to the logic circuitry 162 and that circuitry removes the output signal on line 174 so that switch 154 is opened. The output from the log converter 134 is applied through switch 140 to the analog voltage input of the digital voltmeter 142. This output with the chamber 60-3 in the optical path 104, is proportional to the log of $A_X - A_B$ (the absorbance of the unknown minus the absorbance of the blank). The output of the digital voltmeter applied to display 30 in response to the strobing signal on line 176 is:

$$(A_X - A_B)/(A_S - A_B) \times K$$

The number displayed is directly proportional to the concentration of glucose in the unknown serum and the units display 32 indicates that this number is displayed in units of milligrams per 100 milliliters.

Determination of hemoglobin by the Cyanmethemoglobin procedure employs the absolute mode. In this measurement, chamber 60-1 is empty and is unused in the analysis sequence, and each of chambers 60-2 and 60-3 as supplied in the kit has four milliliters of a reagent. A potassium cyanide tablet is inserted into each chamber 60-2 and 60-3 by the technician to complete the reagent and the dispenser 12 is controlled by output 130-1 of card reader 28 to load 50 microliters of the patient's blood into dispenser channel 14-2. The dispenser is then operated to discharge 50 microliter sample of whole blood into cuvette chamber 60-3. The contents of the cuvette assembly, after the chambers are sealed, are mixed by inversion and the cuvette is incubated in a 37°C unit for 5 minutes. When the incubation period is complete (indicated by the corresponding light 22), the hemoglobin control card 42 is placed in card reader 28 and the incubated cuvette assembly 40 is placed in shuttle carrier 100. The card and card reader produces an output on line 130-2 which causes the filter drive motor 112 to position the 5050 Angstrom filter in the optical path 104 and sets the gains of log converter 134 and scaling amplifier 152. In addition, switch 140 is set to connect the output of the log converter to the analog input of the digital voltmeter in response to card reader output on line 130-7, and switch 150 is set to connect precision voltage source 160 to the reference input of the digital voltmeter 142 via scaling amplifier 152, switch 154 and storage circuit 156.

Upon depression of start button 34, logic 162 causes motor 102 to advance the cuvette assembly 40 from position 1 through position 2 to position 3. Logic circuit 162 conditions switch 136 to maintain the log converter circuitry in zeroing mode until position 3 is reached (and chamber 60-2 is positioned in the optical path 104). In this position the output of the log converter circuit 134 is $A_S$—the absorbance of the material in chamber 60-2. The log converter zeroing operation is terminated by an output from sensor 164 via logic 162 to switch 136 as the cuvette 40 is advanced by shuttle 100 to position the chamber 60-3 in optical path 104. The output of the log converter 134 is now the value $A_x-A_S$ and is applied via switch 140 to the analog input of digital voltmeter 142. The strobing pulse is generated by logic 162 on line 176 to gate the output value generated by digital voltmeter 142 to digital display 30, and at the same time the strobing pulse applied to the error logic to check whether the scaled precision voltage value is within a preset limit as determined by an output from the card reader on line 130-8. As in the other cases, if the output voltage is outside those limits lamp 36 is energized. Display 30 displays the digital value of hemoglobin in grams per 100 milliliters, the digital voltmeter 142 having generating the ratio $(A_x-A_S) \times k/v$, the output being an absolute absorbance measurement of the sample minus a standard.

Enzyme analyses made in a rate mode. For example, in a determination of lactic dehydrogenase (LDH) by the Wacker method, cuvette assembly 40 when received by the technician has a reagent in powder form in chamber 60-2 only. Three milliliters of distilled water are added to chamber 60-2 to reconstitute the reagent and the materials then mixed by inversion and then incubated at 37°C for 10 minutes. When the incubation period is complete, 100 milliliters of serum is added to chamber 60-2, the chamber is resealed and subjected to mixing and then reincubation at 37°C. The corresponding LDH data card 42 is inserted in card reader 28; filter wheel 108 is rotated to position the 3,400 Angstrom filter in the optical path 104 in response to an output on line 130-2; logic 162 is signalled that a rate mode of operation is to be performed in response to an output on line 130-3; the log converter 134 is calibrated in response to an output on line 130-4; switch 140 is set to connect the output of amplifier 148 to the analog input of digital voltmeter 142 in response to an output on line 130-7; switch 150 is set to connect precision voltage source 160 to the reference input of digital voltmeter 142 in response to an output on line 130-5; and the units are set by an output on line 130-9.

In this mode, after the incubated cuvette assembly 40 has been inserted in shuttle 100 upon depression of start button 34, the shuttle is advanced until chamber 60-2 is positioned in the optical path 104. At that point motor 102 is stopped in response to an output from AND circuit 380. Timer 390 is released by a signal on line 358 to AND circuit 384. The log converter 134 has been in a zeroing mode in response to a signal applied from AND circuit 386 through OR circuit 414 to switch 136 and filter network 146 remains reset until time 0011 (switch 230 is held closed by a signal on line 172). The initial absorbance reading, transformed to voltage, has been established by the zeroing operation of the log converter circuit 134 which terminates at time 0010 which the output of OR circuit 388 ends. Starting from this point a linearly increasing voltage ramp is monitored over a period of time controlled by timer 390. This ramp signal is differentiated by differentiator circuit 144 to provide a signal which is passed by filter 146 and absolute value amplifier 148 through switch 140 to the analog input of digital voltmeter 142. At the end of the timing interval (1110), the digital voltmeter is strobed by an output on line 176 to digitally display a reading in international units of the amount of lactic dehydrogenase in the serum. At 1111 time, the output of AND circuit 404 terminates and motor 102 is restarted (the cuvette 40 being promptly reset at point 334); OR circuit 388 has an output that places log converter circuit 134 in a zeroing mode again; and AND circuit 392 ceases to pass clock pulses. Motor 102 stops in response to a signal at terminal 344.

Thus the invention provides a convenient and versatile system for performing a variety of chemical analyses and is particularly useful in performance of analyses of blood and other body fluids. Both mode selection and calibrating information is furnished by a control record. The analysis sequence is automatically performed in any of the modes solely in response to depression of start button 34. No manual adjustments are required. The system is easily operated by untrained personnel and enables analytical information to be made available quickly, accurately and inexpensively.

While a particular embodiment of the invention has been shown and described, various modifications thereof will be apparent to those skilled in the art. For example, the sample chambers may be disposed in a cuvette carrier rather than in one piece unit. Therefore it is not intended that the invention be limited to the disclosed embodiment or to details thereof and departures may be made therefrom within the spirit and scope of the invention as defined in the claims.

What is claimed is:

1. An analysis system comprising container structure having a plurality of chambers, at least one of which contains a stored chemical material, means for introducing a material to be analyzed into said one chamber for mixing with said stored chemical material, a record specifying information as to the nature of said stored chemical material and the type of analysis to be performed, instrumentation for performing an analysis including means for receiving said container structure, sensor circuitry adjacent said container structure receiving means for producing a signal representative of material in the chambers of said container structure in said container structure receiving means, said sensor circuitry comprising a radiation source and a detector in spaced relation defining an optical path, and said container structure receiving means positioning said container structure in said optical path, a first storage circuit responsive to said sensor circuitry for holding a first signal representative of material in a first chamber, a second storage circuit for holding a second signal representative of material in a second chamber as a function of said first signal, and circuitry for generating a comparison signal as a function of said first and second stored signals, and means responsive to information on the record for setting said storage circuits to perform the analysis as a function of information specified by said record.

2. The system as claimed in claim 1 and further including circuitry for modifying an output signal produced by said detector as a function of material in said container structure as a function of another output signal produced by said detector to provide a signal indicative of a parameter of the material in said container structure.

3. The system as claimed in claim 2 and further including means responsive to said record for adjusting said modifying circuitry.

4. The system as claimed in claim 1 wherein said container structure includes three sample chambers for holding an unknown material to be analyzed, a standard material, and a blank material, and said second means includes circuitry for generating three signals $S_1$, $S_2$, and $S_3$, two difference signals $(S_1-S_3)$ and $(S_2-S_3)$, and said comparison signal is a function of the ratio of said two difference signals and indicates a characteristic of said unknown material.

5. The system as claimed in claim 4 and further including means responsive to said record for adjusting said signal generating circuitry.

6. An analysis system comprising a radiation source, a radiation sensor disposed in spaced relation from said radiation source, means for positioning a set of three sample chambers between said radiation source and said radiation sensor circuitry for producing a first output signal in response to radiation passing through two chambers of said set of sample chambers and circuitry for modifying said first output signal as a function of a second output signal produced as a result of radiation passing through the third chamber of said set of sample chambers for generating an output signal that is a function of the ratio of two different signals $(S_1-S_3)$ and $(S_2 - S_3)$ to provide an indication of a characteristic of material in one of said sample chambers.

7. The system as claimed in claim 6 wherein said modifying circuitry includes a first storage circuit for storing a signal $S_3$ representative of the characteristics of material in a first sample chamber, and switch means for controlling the application of signals from said radiation detector to said first storage circuit.

8. The system as claimed in claim 6 and further including sequencing means for moving said set of sample chambers relative to said radiation path and wherein said modifying circuitry includes means responsive to said sequencing means for controlling the generation of said output signal.

9. The system as claimed in claim 6 and further including record sensor means responsive to a record coordinated with the contents of at least one of said sample chambers for controlling said modifying circuitry.

10. A chemical analysis instrument for use with a cuvette carrier having a plurality of sample chambers comprising a photometer section including a radiation source, a radiation detector, a support for positioning a cuvette carrier in an optical path between said radiation source and said radiation detector so that said sample chambers are operatively disposed in said optical path, signal modifying circuitry responsive to the output of said radiation detector for generating an output signal as a function of material in said sample chambers on the radiation in said optical path, said signal modifying circuitry including a logarithmic signal processing circuit, first signal storing circuitry for storing a first output of said logarithmic signal processing circuit as a function of the contents of one sample chamber, second signal storing circuitry for storing a second output of said logarithmic signal processing circuit as a function of the contents of a second sample chamber, sequencer means for controlling said modifying circuitry as a function of the selective operative disposition of said sample chambers in said optical path to store a signal in said first signal storing circuitry and to store a signal in said second signal storing circuitry and output circuitry for generating a modified signal as a function of said stored signals.

11. The instrument as claimed in claim 10 and further including a drive for moving said carrier support relative to said optical path to sequentially position said sample chambers in said optical path.

12. The instrument as claimed in claim 10 and further including a record sensor responsive to a record correlated with said cuvette carrier for adjusting said signal modifying circuitry as a function of the chemical analysis to be performed.

13. The instrument as claimed in claim 12 and further including means responsive to said record sensor for performing an analysis of the rate type and timer means responsive to coding on said cuvette carrier for controlling the application of the resulting output signal to said output circuitry.

14. The instrument as claimed in claim 10 and further including an incubator section including interlock means responsive to coding on said cuvette carrier for providing an incubation control for the chemical analysis to be performed.

15. The instrument as claimed in claim 10 and further including a filter mechanism and a record sensor responsive to a record correlated with said cuvette carrier for selectively positioning a filter in said optical path as a function of the type of chemical analysis to be performed.

16. The instrument as claimed in claim 10 and further including means responsive to a single operation initiating command to cause said sequencer means to initiate and complete an analysis cycle involving the operative disposition of said plurality of sample chambers in said optical path.

17. The instrument as claimed in claim 10 and further including means responsive to an output of said radiation detector for producing an error signal when the output of said radiation detector deviates from a pre-established value by more than a specified amount.

18. The instrument as claimed in claim 10 further including an output device and wherein said signal modifying circuitry includes a reference channel for applying a first signal to said output device as a function of the contents of a first sample chamber and a sample channel for applying a second signal to said output device as a function of the contents of a second sample chamber.

19. The instrument as claimed in claim 18 wherein said signal modifying circuitry further includes a rate channel for applying a third signal to said output device as a function of the rate of change of a characteristic of material in a sample chamber.

20. The instrument as claimed in claim 12 and further including an output device and wherein said signal modifying circuitry includes first and second signal processing channels, each said signal processing channel including means responsive to said record sensor for adjusting the gain of the channel, and means for selectively connecting said first and second channels in circuit between said radiation detector and said output device as a function of the operation of said sequencer means.

21. The instrument as claimed in claim 20 wherein said signal modifying circuitry further includes a third channel having means responsive to the rate of change of the output of said radiation detector and means responsive to said record sensor and said sequencer means for operatively connecting said third channel in circuit between said radiation detector and said output device.

22. The instrument as claimed in claim 20 and further including means responsive to the output of one of said channels for producing an error signal when the output of said one channel deviates from a pre-established value by more than an amount specified by a signal from said record sensor.

23. The instrument as claimed in claim 12 and further including a drive for moving said carrier support relative to said optical path to sequentially position said sample chambers in said optical path.

24. The instrument as claimed in claim 23 and further including a filter mechanism responsive to said record sensor for selectively positioning a filter in said optical path.

25. A chemical analysis instrument for use with a cuvette carrier having a plurality of sample chambers comprising a photometer section including a radiation source, a radiation detector, a support for positioning a cuvette carrier in an optical path between said radiation source and said radiation detector so that said sample chambers are operatively disposed in said optical path, signal modifying circuitry responsive to the output of said radiation detector for generating an output signal as a function of the effect of material in said sample chambers on the radiation in said optical path, an output device, said signal modifying circuitry including a reference channel for applying a first signal to said output device as a function of the contents of a first sample chamber, a sample channel for applying a second signal to said output device as a function of the contents of a second sample chamber, a rate channel for applying a third signal to said output device as a function of the rate of change of a characteristic of material in a sample chamber, detector responsive circuitry for generating an output signal as a logarithmic function of the output of said radiation detector, means for applying said logarithmic function output signal to said reference, sample, and rate channels, means for storing a logarithmic function output signal, means for storing an output signal of said reference channel, a record sensor responsive to a record correlated with said cuvette carrier for adjusting said signal modifying circuitry as a function of the type of chemical analysis to be performed, a filter mechanism responsive to said record sensor for selectively positioning a filter in said optical path, means responsive to said record sensor for adjusting the gains of said logarithmic circuitry and said reference channel, sequencer means for generating control signals as a function of the selective operative disposition of said sample chambers in said optical path, and means responsive to said sequencer means for selectively connecting said reference, sample, and rate channels in circuit between said radiation detector and said output device as a function of the operation of said sequencer means.

26. The instrument as claimed in claim 25 and further including means responsive to a single operation initiating command to cause said sequencer means to initiate and complete an analysis cycle involving the operative disposition of said plurality of sample chambers in said optical path.

27. The instrument as claimed in claim 26 and further including means responsive to an output of said radiation detector for producing an error signal when the output of said radiation detector deviates from a pre-established value by more than an amount specified by a signal from said record sensor.

28. The instrument as claimed in claim 25 and further including an incubator section including interlock means responsive to coding on said cuvette carrier for providing an incubation control for the chemical analysis to be performed.

29. The instrument as claimed in claim 28 wherein said incubator section further includes timer means responsive to said coding on said cuvette carrier.

* * * * *